Figure 1:
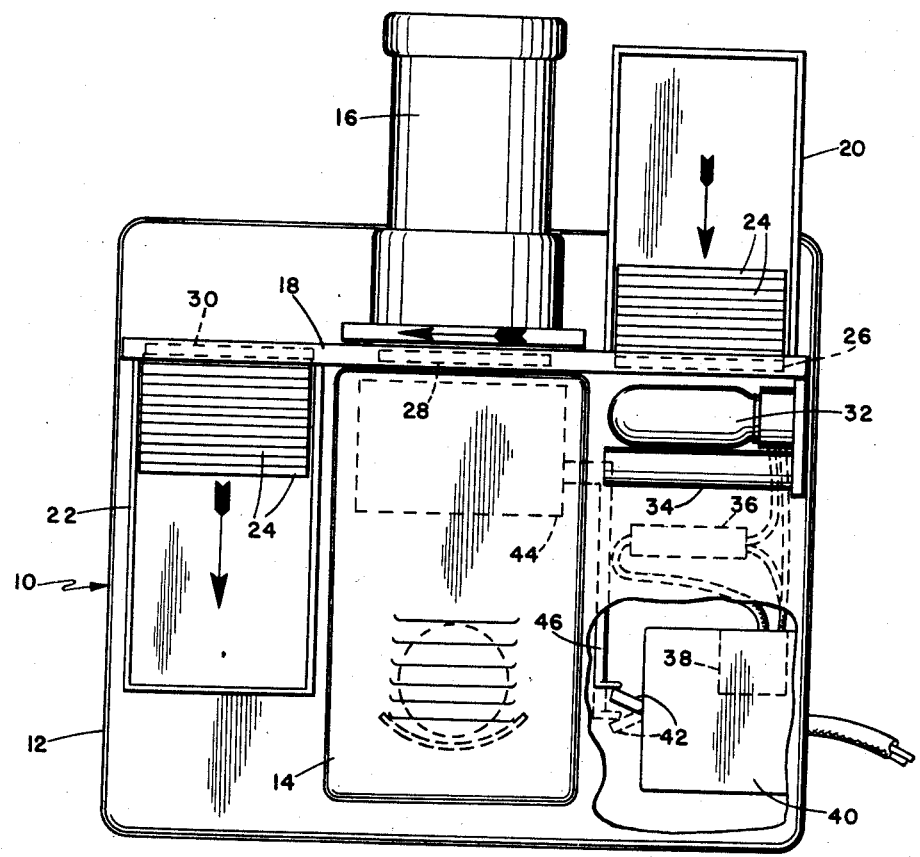

April 26, 1960

R. D. LACOE, JR 2,933,979

SLIDE PRE-HEATER FOR PROJECTORS

Filed July 21, 1958

INVENTOR.
RALPH D. LACOE, JR.
BY
*Knox & Knox*

# United States Patent Office 2,933,979
Patented Apr. 26, 1960

2,933,979

SLIDE PRE-HEATER FOR PROJECTORS

Ralph D. Lacoe, Jr., San Diego, Calif.

Application July 21, 1958, Serial No. 749,682

6 Claims. (Cl. 88—28)

The present invention relates generally to slide projectors and more particularly to a slide pre-heater for slide projectors.

The primary object of this invention is to provide a slide pre-heating means which heats by radiant heat immediately before the slides are advanced to projection position, so that all dimensional changes in the slides due to heating are completed before the slides are displayed, thus eliminating the possibility of distortion occurring during projection.

Another object of this invention is to provide a slide pre-heater in which the heat is controlled to approximate very closely the actual heat at the projection position.

A further object of this invention is to provide a slide pre-heater having a two stage heating element which is automatically brought to a high heat for a predetermined time for fast heating and is then reduced to a lower stand-by heat to prevent overheating and damage to the slides.

Another object of this invention is to provide a slide pre-heater which is practicable and inexpensive to manufacture.

Finally, it is an object to provide a slide pre-heater of the aforementioned character which is simple, safe and convenient and which will give generally efficient and durable service.

Figure 2:
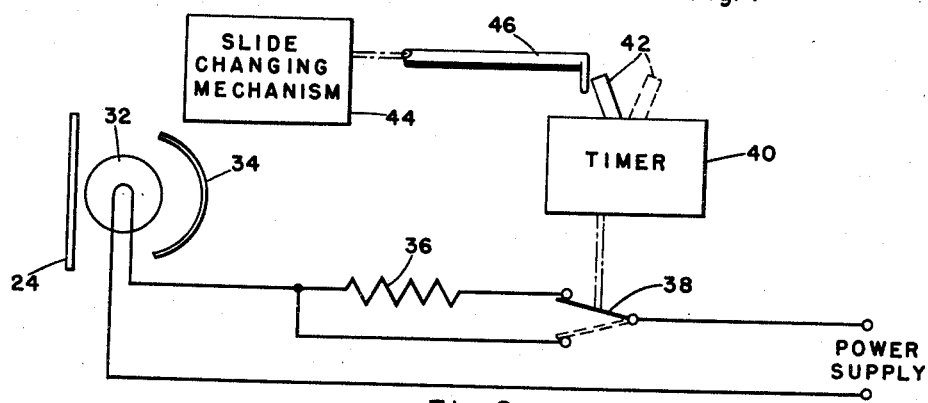

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Figure 1 is a top plan view of a projector, partially cut away, showing the slide pre-heater means installed; and Figure 2 is a diagrammatic showing of the circuitry and mechanism of the pre-heater.

Similar characters of reference indicate similar or identical elements and portions throughout the specification and throughout the views of the drawing.

Referring now to the drawing in detail, the projector 10 is conventional and has a base 12 on which is a lamp house 14 and a lens assembly 16, a slide carrier 18 being mounted between the lamp house and lens assembly. The specific structure of the projector is not critical since the pre-heater is adaptable to many types of existing projectors. The projector 10 is equipped with slide magazines 20 and 22 for incoming and viewed slides, respectively. In the projector shown, the slides 24 are fed from one end of the magazine 20 into one end of the slide carrier 18, that is, to the feed position, as indicated in dash line at 26 in Figure 1, each slide being then advanced to the projection position 28 for display on a screen. After viewing, these slides are advanced to the ejection position 30 for ejection into the magazine 22, all as shown by the directional arrows.

The slide pre-heater comprises a heater element 32 mounted on the base 12 adjacent the end of the incoming slide magazine 20 at the feed position 26, said heater element being illustrated as a conventional incandescent lamp, which has been found ideal for the purpose, although other heating means may be used. A reflector 34 is provided to concentrate the heat of the element 32 on the slides 24. The heater element 32 is connected to a power supply, such as a conventional A.-C. outlet, through a dimmer resistor 36, which is connected to one pole of a single pole, double throw switch 38, said heater element being connected directly to the other pole of said switch so that the resistor 36 can be thrown in or out of the circuit. The switch 38 is actuated by a timer 40 which may be of any sutiable type such as a simple clockwork timer, the mechanism having a reset arm 42 which starts the timer and operates the switch 38 in one direction. The circuit is arranged so that, when the timer 40 is started, the switch 38 cuts the resistor 36 out of the circuit as indicated in dash line, causing the full power to be applied to the heater element 32 for high heat. When the timer 40 completes its cycle, the switch 38 is thrown over bringing the resistor 36 into the circuit and reducing the current flow to the heater element for low heat. Various types of timers having the required features are readily available and the mechanism need not be described in detail.

Each slide must necessarily be heated at the feed position 26 to the approximate temperature experienced at the projection position. By doing this the buckling which takes place in the slide due to heating is completed before the slide is projected and the lens can be pre-focused to allow for the buckled condition of the slide, the phenomenon and problems involved being well known in the art. Since individual slides may be displayed for different periods of time, a heater which is fixed at one temperature would overheat some slides and fail to heat others sufficiently. By using a timer 40, the required heat is applied for the proper length of time to bring the slide to the desired temperature very quickly, after which the heat is reduced to hold the slide at that temperature without damaging the emulsion.

The mechanism used to move the slides within the slide carrier 18 provides an ideal means to operate the timer 40 in sequence with the changing of slides. Since this mechanism may be manually, mechanically, or electrically operated, the mechanism is indicated in block form at 44. Regardless of the type of mechanism used, it is a simple mechanical expedient to connect a push rod 46 to the mechanism to trip the timer reset arm 42 each time a slide is advanced. Thus each slide 24 coming into the feed position 26 is immediately subjected to the high heat from the element 32 and, due to the transparency of the slides a certain amount of the heat is diffused through to warm the first few slides in the magazine to some degree.

Certain existing devices for heating slides use hot air blown between the slides while they are in the magazine. In this method, accurate heat control is virtually impossible and overheating often occurs. Furthermore, due to the current of hot air, the emulsion in the slides is dehumidified and becomes brittle with obvious results. In using my radiant heating means described rather than convection type heating, it has been found that a small lamp of about 30 watts will bring the slides to the proper temperature in about ten seconds, although this may vary according to the specific arrangement of the installation. Also, due to the high rate of initial heating, the slides are heated for projection without a lengthy warm-up period when starting projection, whereas in other systems, the first few slides require considerable time to reach projection temperature. The positioning of the components, other than the heater element 32, is not critical and may be altered to suit particular projectors.

The operation of this invention will be clearly comprehended from a consideratoin of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. In combination: a slide projector having a slide carrier, a slide-containing magazine having one end communicating with said slide carrier, and means for advancing slides individually from said magazine to a projection position in said slide carrier; and a slide pre-heater comprising means to direct heat onto the foremost of said slides; and timed control means operatively connected to said pre-heater to reduce the heat generated thereby after a predetermined period of time, thus maintaining a predetermined standby temperature in said foremost slide.

2. A combination according to claim 1 wherein said timed control means has a cycle of operation with accelerated initial heating in the first part of the cycle followed by a slower temperature-maintaining heating in the remainder of the cycle.

3. In combination; a slide projector having a slide carrier, a slide-containing magazine having one end communicating with said slide carrier, and means for advancing slides individually from said magazine to a projection position in said slide carrier; a slide pre-heater comprising an electrical radiant heater element operatively mounted adjacent said end of the magazine; a source of electrical power connected to said heater element; a resistor; means for connection of said resistor between said element and said source to reduce the heat of said element; and a timer to delay said connection for a short time interval after each operation of said means for advancing.

4. In combination: a slide projector having a slide carrier, a slide-containing magazine having one end communicating with said slide carrier, and means for advancing slides individually from said magazine to a projection position in said slide carrier; a slide pre-heater comprising an electrical radiant heater element operatively mounted adjacent said end of the magazine; a source of electrical power connected to said heater element; a resistor; a two-position switch connected to said heater element to connect said resistor selectively thereto at one position of the switch and reduce the heat of the element; a timer operatively connected to said switch, whereby the switch is held at a second position to operate the heater element at full heat for a predetermined period of time; and means for re-setting said timer in synchronization with the arrival of each slide at said one end of the magazine.

5. In combination: a slide projector having a slide carrier, a slide-containing magazine having one end communicating with said slide carrier, and means for advancing slides individually from said magazine to a projection position in said slide carrier; a slide pre-heater comprising an electrical radiant heater element operatively mounted adjacent said end of the magazine; a source of electrical power connected to said heater element; a resistor; a two-position switch connected to said heater element to connect said resistor selectively thereto at one position of the switch and reduce the heat of the element; a timer operatively connected to said switch, whereby the switch is held at a second position to operate the heater element at full heat for a predetermined period of time; and actuating means connected to said means for advancing to re-set said timer as each slide is advanced to the projection position.

6. In combination: a slide projector having a slide carrier, a slide-containing magazine having one end communicating with said slide carrier, and means for advancing slides individually from said magazine to a projection position in said slide carrier; and a slide preheater comprising means to direct heat onto the foremost of said slides; and timed control means operatively connected to said pre-heater to reduce the heat generated thereby after a predetermined period of time, thus maintaining a predetermined standby temperature in said foremost slide; said pre-heater being a radiant heater operatively mounted to direct radiant heat onto said foremost slide and, by reason of transparency of the slides, to heat the succeeding slides to a lesser degree.

References Cited in the file of this patent

UNITED STATES PATENTS

| | | |
|---|---|---|
| 2,294,219 | Woermann | Aug. 25, 1942 |
| 2,362,601 | Wengel | Nov. 14, 1944 |
| 2,594,162 | Hartley | Apr. 22, 1952 |
| 2,627,017 | Howard | Jan. 27, 1953 |